US010623554B1

United States Patent
Pawar et al.

(10) Patent No.: US 10,623,554 B1
(45) Date of Patent: Apr. 14, 2020

(54) LIMITING VOICE FILTER BANDWIDTH FOR DEVICE MODEL BASED ON OBSERVED SOUND QUALITY OF VOICE-CALL COMMUNICATIONS

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/351,077

(22) Filed: Mar. 12, 2019

(51) Int. Cl.
*H04W 24/00* (2009.01)
*H04M 1/725* (2006.01)
*H04W 72/04* (2009.01)
*H04W 48/02* (2009.01)
*H04W 24/08* (2009.01)
*H04W 48/12* (2009.01)

(52) U.S. Cl.
CPC ... *H04M 1/72577* (2013.01); *H04M 1/72597* (2013.01); *H04W 24/08* (2013.01); *H04W 48/02* (2013.01); *H04W 48/12* (2013.01); *H04W 72/0453* (2013.01)

(58) Field of Classification Search
CPC ..... H04W 24/00; H04W 24/02; H04W 24/06; H04W 24/08; H04W 16/18; H04W 88/02
USPC .................................................. 455/423, 425
See application file for complete search history.

(56) References Cited

U.S. PATENT DOCUMENTS

| | | | | |
|---|---|---|---|---|
| 6,304,634 B1 * | 10/2001 | Hollier | ................ | H04M 3/2236 379/1.02 |
| 8,689,105 B2 * | 4/2014 | Hardy | ................ | H04M 3/2236 704/233 |

* cited by examiner

*Primary Examiner* — Temica M Beamer

(57) ABSTRACT

A method and system to limit voice-filter bandwidth based for a device model based on observed sound quality trend. A system monitors sound quality of voice-call communications coming from various devices and detects based on the monitoring that the sound quality of voice-call communications coming from devices of a particular model tends to be threshold low even when the devices have threshold high quality wireless coverage. In response the system then imposes a policy for devices of that model to restrict the voice-filter bandwidth that they apply—such as by limiting the devices to use a voice-filter bandwidth that is no wider than a designated bandwidth.

20 Claims, 3 Drawing Sheets

LIMITING VOICE FILTER BANDWIDTH FOR DEVICE MODEL BASED ON OBSERVED SOUND QUALITY OF VOICE-CALL COMMUNICATIONS

BACKGROUND

A wireless communication system typically includes a number of base stations that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each base station could be coupled with a core network including a gateway system that provides connectivity with various application servers and/or transport networks, such as the public switched telephone network (PSTN) and/or the Internet for instance. With this arrangement, a UE within coverage of the system could engage in air interface communication with a base station and could thereby communicate via the base station with various application servers and other entities.

Such a system could operate in accordance with a particular radio access technology, with communications from the base stations to UEs defining a downlink or forward link and communications from the UEs to the base stations defining an uplink or reverse link.

In accordance with the radio access technology, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various generations of radio access technologies in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

When a UE first enters into coverage of such a system, the UE could detect coverage of a base station and then engage in random-access signaling and connection signaling with the base station in order to establish a connection for carrying communications wirelessly between the UE and the base station. Further, the UE could engage in attachment signaling via the base station with a control system of the access network. And the control system could authenticate the UE and then prepare the core network to carry communications between the UE and one or more transport networks.

OVERVIEW

In a representative wireless communication system, UEs could engage in voice-call communications. In practice, for instance, a UE could engage in signaling with a base station and/or one or more other entities to set up a voice call to or from another device, and the UE could then engage in the voice call, with outbound voice audio passing from the UE to the other device for presentation to a user of the other device, and with inbound voice audio passing from the other device to the UE for presentation to a user of the UE.

Such voice-call communication could be circuit-based and/or packet-based. But in either case the voice audio would typically be communicated in digital form. For outbound voice audio, for instance, the UE could receive analog audio input representing voice of a user of the UE (possibly together with other sounds), the UE could apply a voice filter to limit the received input to an appropriate voice frequency range, and the UE could sample the filtered audio to produce a digital bit stream representing the audio. The UE could then encode the bit stream using a voice codec, to help compress the bit stream or for other purposes, and the UE could transmit the encoded bit stream over the air to the UE's serving base station, for transmission in turn via the core network for ultimate receipt, decoding, and playout by another device.

Depending on the voice codec and/or other factors in this process, the voice filter that the UE applies to filter the outbound audio signal might be configured with any of various frequency bandwidths, each defining a passband of particular width in frequency (e.g., Hertz (Hz)). For instance, the well-known Enhanced Voice Services (EVS) codec supports at least four different voice-filter bandwidths defining progressively wider ranges of frequency: narrowband (e.g., 300-3400 Hz), wideband (e.g., 50-7000 Hz), super-wideband (e.g., 50-14000 Hz), and full band (e.g., 50-20000 Hz). Other voice codecs, such as Adaptive Multi-Rate (AMR) codecs, may also support various voice-filter bandwidths.

A UE could be configured to apply a specific voice-filter bandwidth in all cases, or a UE could be configured select a voice-filter bandwidth to use on a case by case basis, considering factors such as the UE's wireless channel quality or the like.

Unfortunately, however, the sound quality of voice communications transmitted by particular model UEs that use especially wide voice-filter bandwidth may be undesirably low. For instance, when certain models of UEs apply the EVS codec with the super-wideband voice filter, the voice communications that come from those UEs may have tinny-sounding after-effects or other sound-quality issues. Whereas, if those same models of UEs would use a narrower voice-filter bandwidth, then the voice communications coming from those UEs may be clearer. One possible reason for this issue could be that certain models of UEs are not optimized to use such wide voice-filter bandwidth. For instance, the hardware, software, and/or firmware of such UEs might not be configured to support clear enough sound or sound-encoding across such a wide swath of audio frequency.

In accordance with the present disclosure, one way to help address this issue is to have the wireless communication system monitor the sound quality of voice-call communications coming from various UEs, to detect based on that monitoring that the sound quality of voice-call communications coming from UEs of a particular model tends to be threshold low, and to then responsively have the wireless communication system impose a policy for UEs of that model to restrict the voice-filter bandwidth that they apply—such as by limiting the UEs to use a voice-filter bandwidth no wider than a designated bandwidth.

Further, in the course of detecting instances where sound quality of voice-call communication from various UEs is threshold poor, this process could look specifically for such instances where the UEs at issue had threshold high-quality wireless coverage. By focusing on instances of poor sound quality from UEs having high-quality wireless coverage at the time, the process could help avoid considering instances where the poor sound quality may have resulted from the UEs being in poor wireless coverage.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss example implementation in the context of a wireless communication system that supports voice over Internet Protocol (VoIP) call communication. It should be understood, however, that numerous variations from the details discussed are possible. For instance, the disclosed principles could extend to apply with respect to other types of networks and protocols, including possibly circuit-based voice-call communication. Further, various components and process steps could be added, removed, combined, distributed, re-ordered, or otherwise modified. In addition, it will be understood that operations described herein as being carried out by one or more entities could be carried out in various ways, such as by a processing unit programmed with software instructions and/or with various hardware and/or other components.

Figure 1:
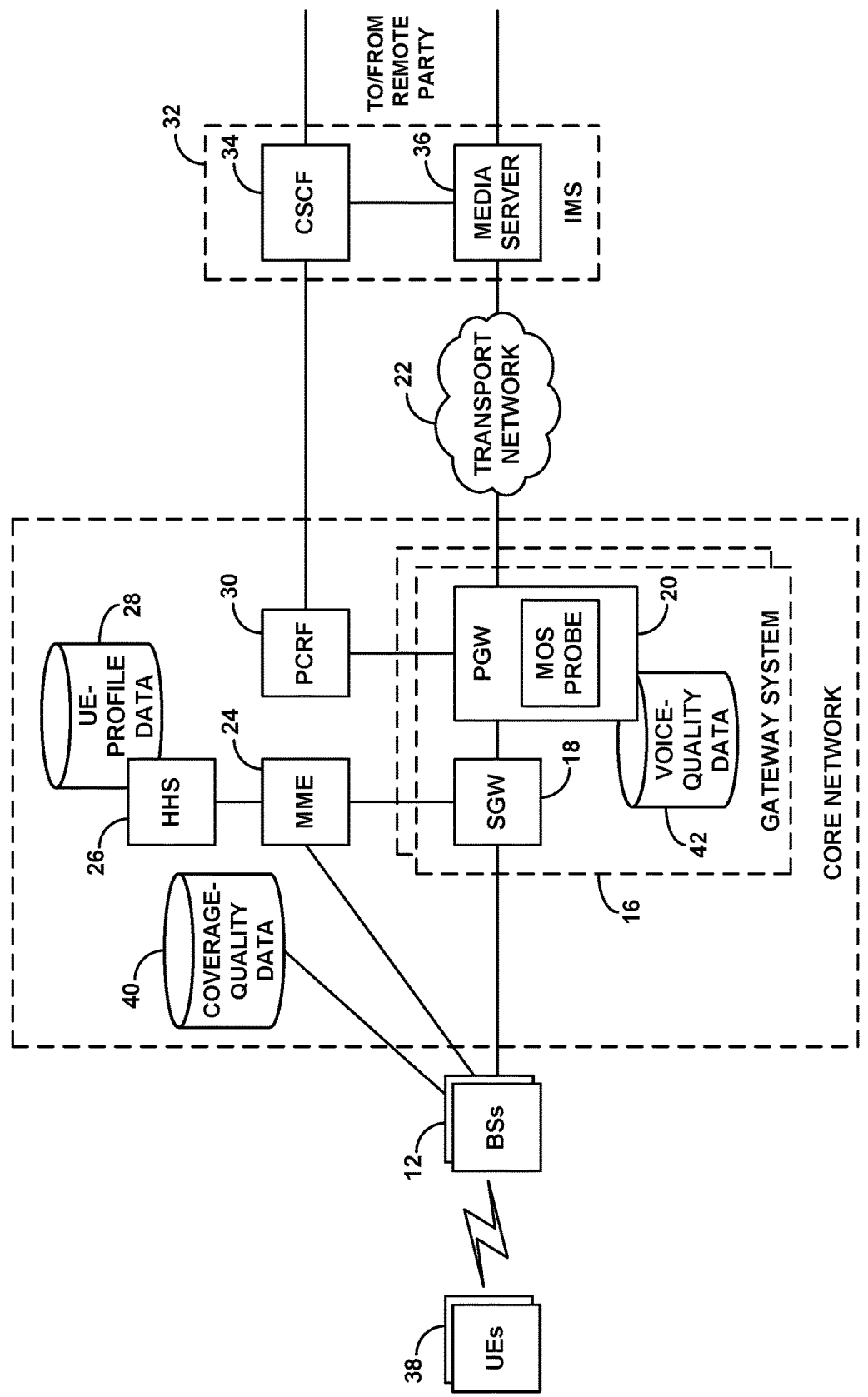
FIG. 1 is a simplified block diagram of an example network arrangement in which features of the present disclosure can be implemented.

Referring to the drawings, as noted above, FIG. 1 is a simplified block diagram of an example network arrangement in which the features of the present disclosure can be implemented. As shown in FIG. 1, the example arrangement includes a plurality of base stations 12 each sitting as a node on a core network 14, such as an Evolved Packet Core (EPC) network or a Next Generation Core (NGC) network for instance. A single connection line is shown between the base stations and the core network for simplicity.

Each base station in the example arrangement has an interface with one or more gateway systems 16, an example one of which is shown including a serving gateway (SGW) 18 interfaced with a packet-data serving gateway (PGW) 20 that provides connectivity with a transport network 22 such as the Internet or another packet-switched network. Further, each base station has an interface with a mobility management entity (MME) 24 that operates as a core-network controller. And the MME has an interface with the SGW and an interface with a home subscriber server (HSS) 26 that includes or has access to a profile store (e.g., database) holding UE profile data 28, and the PGW has an interface with a policy charging and rules function (PCRF) 30 that operates as a policy decision point to control operation of the PGW.

UE profile data 28 could include, for each of various UEs that subscribe to or will otherwise use service of the wireless communication system a profile record specifying subscription data and configuration and capabilities data of the UE. The profile data for each UE could be keyed to UE identity, such as International Mobile Subscriber Identity (IMSI) and International Mobile Equipment Identity (IMEI). And the profile data could indicate services to which the UE subscribes or which the UE otherwise supports, such as data communication service and VoIP service for instance. Further, the profile data could also indicate or correlate to information about configuration of the UE, such as the UE's model (e.g., manufacturer and model number) and the UE's currently installed firmware version, among other possibilities.

Shown sitting as a node on transport network 20 is then an Internet Multimedia Subsystem (IMS) platform 32, which supports VoIP services for served UEs. The example IMS 32 is shown including a call session control function (CSCF) 34 and a media server 36, with the CSCF having interfaces with the media server, the PCRF, and the PGW, and the media server further has an interface with the PGW. With this arrangement, the CSCF operates as an advanced proxy server, to facilitate signaling for setup of VoIP calls, and the media server operates to communicate packet-based voice call communications, such as to bridge VoIP call communication between a served UE and a remote call party for instance.

Additionally, shown within coverage of base station(s) 12 are a plurality of representative UEs 38. In an example implementation, each such UE is VoIP capable, being equipped with hardware and associated logic to enable placement and receipt of voice calls. Among other things, this could include each UE being equipped with a voice filter with a selectable or configurable passband bandwidth or having multiple voice filters with different passband bandwidths, so that the UE could selectively apply one of various possible voice-filter bandwidths. Further, this could include each UE being configured to engage in voice-call setup signaling with IMS 32 in order to set up a voice call to or from the UE, and logic to then engage in the voice call, including filtering, digitizing, encoding, and packetizing outbound audio, and transmitting resulting voice packets for receipt by the IMS or another entity.

In an example implementation, the base stations and UEs could be configured to operate on one or more carriers according 4G LTE or another RAT. On each such carrier, the air interface between a base station and served UEs could be divided over the carrier's frequency bandwidth into subcarriers and over time into frames, subframes, timeslots, and symbol time segments, with the intersections of subcarriers and symbol time segments defining resource elements that can be modulated to carry data communications. And in each subframe, these resource elements could be divided into groups defining physical resource blocks (PRBs), which the base station could be configured to allocate on an as-needed basis to carry communications to and from served UEs. Further, various resource elements could be reserved to carry special signals, such as a downlink reference signal that UEs could evaluate to determine coverage strength or the like.

With this arrangement, as UEs enter into coverage of the system, the UEs could establish connections and attach with the network as noted above, to facilitate engaging in wireless packet-data communication service, including VoIP service.

For instance, when a UE discovers sufficiently strong coverage of a base station, the UE could engage in random-access signaling and Radio Resource Control (RRC) signaling with the base station to establish an RRC connection with the base station, and the base station could establish and store a context-record for the UE, indicating that the base station is serving the UE with the established RRC connection.

Further, the UE could then transmit over the air and via the base station to the MME an attach request seeking to register or attach for service with the network. And in response, the MME could then interwork with the HSS to authenticate the UE. And upon authentication of the UE, the MME could then coordinate setup for the UE of one or more bearers (e.g., packet tunnels) through the core network via the SGW between the UE's serving base station and the PGW. For instance, the MME could engage in bearer-setup signaling with the SGW and with the base station, the SGW could engage in responsive bearer-setup signaling with the PGW, and the PGW or an associated server could assign an Internet Protocol (IP) address for use by the UE to engage in communication on network 22. This bearer-setup signaling could carry the UE's identity (e.g., IMSI and IMEI), and the SGW and PGW could also establish and store context records for the UE indicating the bearer(s) established for the UE and the UE's identity and IP address for instance.

In addition, the base station could extend each such bearer over the air to the UE by setting up one or more corresponding radio data bearers encompassed by the UE's RRC connection and storing in the UE's context record an indication of each established bearer. And the base station could convey to the UE the assigned IP address and other information. Further, during or after the attachment process, the HSS could convey to the MME, and the MME could convey to the base station, a record of the UE's service profile, and the base station could store that profile data in the UE context record for reference while serving the UE.

In a representative implementation, each bearer that the MME sets up for the UE has an associated quality of service class identifier (QCI) value that indicates quality-of-service attributes of the bearer, such as whether the bearer is to have a guaranteed minimum bit rate (GBR) or is rather to receive best-efforts service for instance, and each entity in the bearer path (e.g., the base station, the SGW, and the PGW) could be set to treat communications on the bearer accordingly. The MME could initially establish for a UE a default (non-GBR) bearer with QCI=9 for use to carry general Internet communications to and from the UE. Further, if the UE's profile indicates that the UE supports VoIP service, the MME could also initially establish for the UE an IMS-signaling bearer with QCI=5 for use to carry VoIP setup and control signaling between the UE and the IMS.

Once the UE is so connected and attached, the base station could then serve the UE over the UE's established RRC connection, coordinating packet-data communication over the UE's bearers. For instance, the PGW receives packet-data destined to the UE's IP address, the PGW could forward that packet-data over an appropriate established bearer through the core network to the base station, and the base station could then coordinate downlink transmission of that packet-data on one or more PRBs to the UE. And when the UE has packet data to transmit on a particular bearer, the UE could send a scheduling request to the base station, the base station could coordinate uplink transmission of that packet-data on one or more PRBs from the UE to the base station, and the base station could forward that packet-data over the associated bearer to the PGW for output on network 22.

To place or receive a VoIP call, the UE could so engage in packet-data communication to facilitate VoIP-setup signaling with the IMS and then exchanging of packetized-voice data with the IMS. For instance, the UE could engage in packet-based VoIP-setup signaling such as Session Initiation Protocol (SIP) signaling with CSCF 30 of the IMS, including exchanging of Session Description Protocol (SDP) information and address information, to reach agreement on setup of a packet-based real-time media session (e.g., a Real-time Transport Protocol (RTP) session) defining a VoIP call leg between the UE and media server 36. And as a result of this signaling, the CSCF could engage in signaling with the PCRF 30 to trigger setup for the UE of a dedicated GBR bearer using QCI=1 for carrying the packetized voice-call communication traffic of the call, which could result in signaling and updating of status at the PGW, SGW, base station, and UE.

Once the VoIP call and QCI 1 bearer are thus set up, the UE could then engage in the voice-call communication of the call. As for outbound voice audio for instance, as noted above, the UE could feed received voice audio (possibly including other sounds) through an applicable voice-filter and could then sample and digitize the filtered audio signal to produce a digital bit stream. The UE could then apply an appropriate voice codec such as EVS, AMR, or the like, to encode the bit stream so as to produce an encoded bit stream. And the UE could then divide the bit stream over time into segments and transmit each segment in an IP packet to the IMS. The IMS could then forward each such packet to another call party, or the IMS could extract the voice audio or voice audio data from the packets and transmit the audio or audio data via another mechanism to the other call party, among other possibilities.

In an example implementation, the voice-filter bandwidth that any such UE applies in this process could be provisioned by the wireless communication system, possibly allowing for dynamic selection of voice-filter bandwidth based on various factors.

For example, an operator of the wireless communication system (e.g., a service provider of a UE) could decide for one reason or another that the UE should use the EVS codec and that the UE could opt to apply any voice-filter bandwidth in the set of narrowband, wideband, and super-wideband. Or the operator might specify that the UE should always apply super-wideband or another designated voice-filter bandwidth. And the operator could then store this provisioning information for the UE in the UE's service profile in data store 28.

When the UE attaches, the wireless communication system could then convey this provisioning information to the UE as a directive or information that will cause the UE to operate accordingly. For instance, in a message that is part of the attachment signaling between the UE and the MME, the MME could convey to the UE a specification of one or more allowed or disallowed voice-filter bandwidths, such as an indication of "nb-swb" to mean that the UE could use narrowband, wideband, or super-wideband voice-filter bandwidth, an indication of "swb" to mean that the UE should use super-wideband voice-filter bandwidth but not narrowband or wideband voice-filter bandwidth, or the like. Or the base station could ascertain this information from the UE's service profile and could likewise direct the UE what voice-filter bandwidth to use or to not use. In any event, the UE could thus receive such a directive or information and set itself to operate accordingly, so that when the UE engages in a VoIP call, the UE would apply an appropriate voice-filter bandwidth.

Further, when a base station serves a UE in an RRC connected mode, the UE could also provide the base station with reports of the quality of wireless coverage observed by the UE. For instance, the UE could periodically evaluate strength of the base station's reference signal and transmit to the base station a measurement report specifying an associated signal-to-interference-plus-noise (SINR) value, such as reference signal receive power (RSRP) or reference signal receive quality (RSRQ), among other possibilities. Further, the UE could periodically transmit to the base station a channel quality indicator (CQI) value that indicates quality of the UE's wireless connection with the base station.

The base station could use these or other such coverage-quality reports from the UE as a basis to control whether to trigger handover scanning and as a basis to control what modulation and coding scheme is used for data transmission between the base station and the UE. Further, the base station could store these measurements or associated data in a coverage-quality data store 40 in the core network, or the base station could convey these measurements to a server or other node that could store the measurements or associated data in data store 40, for use to facilitate network performance monitoring and coverage planning or the like. These coverage-quality measurements could be stored as records that correlate UE identity with timestamp data indicating when the UE reported the indicated coverage-quality, among other possibilities.

As noted above, an issue that can arise in a system such as this is that the sound quality of voice-call communications coming from certain UEs that apply relatively wide voice-filter bandwidth may be undesirably low.

In practice, the wireless communication system could be configured to apply a live-trace or probe that evaluates and records the sound quality of such communications. The system could implement such one or more such probes anywhere in one or more voice-call communication paths. For instance, each of one or more PGWs of the core network could be equipped with such a probe.

A representative probe could operate on a transient copy VoIP packets transmitted from each of various UEs, each flowing along a bearer specific to a respective UE having a respective UE identity (e.g., IMSI/IMEI). In particular, for voice-call communication from a given UE, the probe could programmatically de-packetize and decode the voice call data carried by a sequence of VoIP packets from the UE. And the probe could programmatically evaluate the sound quality of the underlying voice audio in the analog or digital domain in a known manner, to establish a Mean Opinion Score (MOS) representing sound quality of the voice audio. In an example implementation, the MOS value could range from 1 to 5, with 1 being the poorest sound quality and 5 being the best sound quality.

Such a probe could keep a record of the sound quality that it determines for voice-call communication on a per UE basis. For instance, the probe could store in a voice-quality-data store 38 the determined MOS value in correlation with the associated UE identity and a timestamp indicating the time that the voice-call communication was occurring. Thus, as one or more such probes evaluates the sound quality of voice-call communication coming from various UEs, the voice-quality-data store 42 could hold records of the determined voice quality with UE identity and timestamp information.

Figure 2:
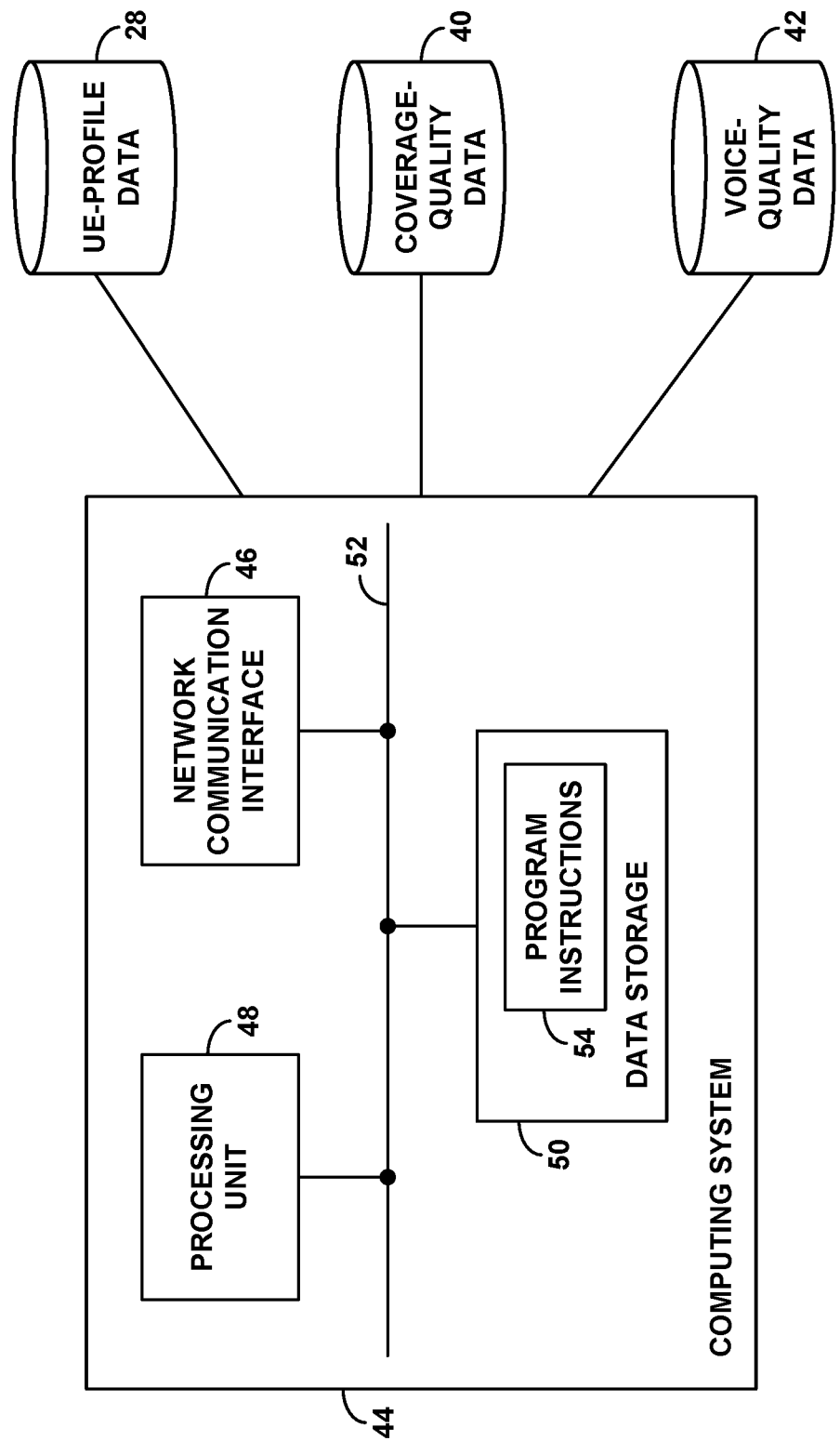
FIG. 2 is a simplified block diagram of a computing system operable in accordance with the disclosure.

In accordance with the present disclosure, a computing system could make use of this and the other data discussed above in order to determine that the sound quality from UEs of a particular model tends to be threshold poor. FIG. 2 illustrates an example such computing system 40, which could be implemented as a separate server within the core network and/or could be integrated with various other core-network entities such as those discussed above.

As shown in FIG. 2, the example computing system 44 includes a network communication interface 46 a processing unit 48, and non-transitory data storage 50, which could be integrated together in various ways and/or communicatively linked together by a system bus, network, or other connection mechanism 52.

The network communication interface 46 could comprise a wired or wireless interface, such as an Ethernet module, through which the computing system could communicate with various other entities, such as to gain access to data stored in various data stores in the core network. The processing unit 48 could then comprise one or more general purpose processors (e.g., microprocessors) and/or one or more special-purpose processors (e.g., digital signal processors or application specific integrated circuits). And the data storage 50 could comprise one or more volatile and/or non-volatile storage components, such as magnetic, optical, or flash storage. Further, as shown, the data storage could hold program instructions 54, which could be executable by the processing unit to cause the computing system to carry out various operations described herein.

As further shown, computing system 44 could have interfaces or communication paths to access data of the various data stores discussed above, including the UE profile data store 28, the coverage-quality data store 40, and the voice-quality data store 42. Executing program instructions 54, the computing system could regularly (e.g., periodically) evaluate this data in an effort to identify trends regarding sound quality of voice-call communications from UEs. In particular, for present purposes, the computing system could conclude based on this data that the sound quality of voice-call communications from UEs of a particular model tends to undesirably poor even when the UEs are in good wireless coverage.

To perform this analysis, the computing system could query various data stores in sequence or using a composite query. For instance, the computing system could query the voice-quality-data store 42 to identify instances where sound quality of voice-call communication from UEs was predefined threshold poor, such as where the MOS value of such communications was lower than a predefined (e.g., operator-defined) threshold indicative of undesirably poor quality, such as any MOS value lower than 3 or lower than 2.5 for example. For each such identified instance, the computing system could attain an associated record indicating the associated UE identity (of the UE from which the voice-call communication came) and timestamp (of when the poor voice sound quality occurred).

Further, the computing system could query the coverage-quality-data store 36 to determine which of the identified instance of poor sound quality occurred when the associated UE had predefined threshold high-quality wireless coverage, such as where the UE had most recently reported SINK that was at least as high as a predefined (e.g., operator defined) threshold indicative of high quality wireless coverage. To facilitate this, the computing system could correlate timestamps and UE-identities between the poor-voice-quality instances and coverage-quality records. Through this process, the computing system could thereby establish a subset of instances the sound quality of voice-call communication from UEs was deemed to be threshold poor even though the UEs had wireless coverage that was deemed to be threshold high quality (or not threshold low quality).

Still further, the computing system could query the UE-profile data to determine, based on UE identify information, the model of each UE that was so determined to have had threshold poor voice sound quality while in threshold good wireless conditions. The computing system could then roll up the this data to establish counts, rates, or other metrics that indicates how many UEs, or what portion of UEs, of a particular model (e.g., all having the same model as each other, such as the same make, model, and perhaps the same firmware version as each other) were determined to have threshold poor voice sound quality while in threshold good wireless conditions. And the computing could deem a threshold quantity, portion (e.g., percentage), or other measure to indicate that UEs of that particular model tend to have threshold poor voice sound quality while in threshold good wireless conditions.

For instance, if the computing system determines that at least 75% of UEs of a particular model have been observed to have threshold poor voice sound quality while in threshold good wireless coverage, then the computing system could conclude that UEs of that model tend to have threshold poor sound quality while in threshold good wireless conditions.

In response to determining through this or another analysis that the sound quality of voice-call communications from UEs of a particular model tends to be threshold poor even when the UEs are in threshold good wireless conditions, the computing system could then take action to facilitate imposing a policy to restrict the voice-filter bandwidth applied by UEs of that model. For instance, the policy could be to limit UEs of that model to use no wider than a specific designated voice-filter bandwidth, such as no wider than wideband (and thus not super-wideband) or the like.

Here, the thought is that limiting the voice-filter bandwidth applied by such UEs might help to improve the sound quality of voice-call communications from those UEs, especially if the UEs of that model are not optimized to handle wider voice-audio bandwidth.

To impose this policy, the computing system could modify UE profile data stored in UE-profile-data store 28 so as to have the profile of each UE of the particular model specify the desired voice-filter bandwidth limitation. For instance, if the profiles of such UEs allow for narrowband to super-wideband (e.g., "nb-swb") voice-filter bandwidth, the computing system could change those profiles to allow only narrowband to wideband (e.g., "nb-wb") voice-filter bandwidth. Or if the profiles of such UEs allow only super-wideband voice-filter bandwidth, the computing system could change those profiles to allow only wideband voice-filter bandwidth, among other possibilities. The computing system could implement these profile changes by querying the profile-data store for profiles of UEs having the model at issue and then changing each such profile.

Having so changed the profiles of UEs of the model at issue, when those UEs next attach and are provisioned with a specification of one or more permissible voice-filter bandwidths, the UEs would be so provisioned with the restricted voice-filter bandwidth, such as to not apply a voice-filter bandwidth as wide as super-wideband for instance. Whereas, UEs of other models may not be so restricted. Thus, when UEs of the model at issue engage in VoIP communication, the UEs would apply the policy and thus be restricted in what voice-filter bandwidth they apply.

Alternatively, the established policy to restrict voice-filter bandwidth of UEs of the particular model could be enforced in other ways as well. For instance, the CSCF 34 of the IMS 32 could be configured to dictate the policy to the UE within VoIP call-setup signaling with the UE. To facilitate this, the CSCF could be provided with access to similar UE profile data, perhaps with access to UE-profile-data store 28 or a replicated copy of some or all of such data. And the UE could include in its VoIP call-setup signaling with the CSCF the UE's identity. Accordingly, the CSCF could query the profile data based on the UE's identity and could thereby determine that the UE's voice-filter-bandwidth should be restricted. And the CSCF could indicate this limitation to the UE within one or more SDP fields of SIP messaging to the UE, to likewise cause the UE to implement the restriction.

Figure 3:
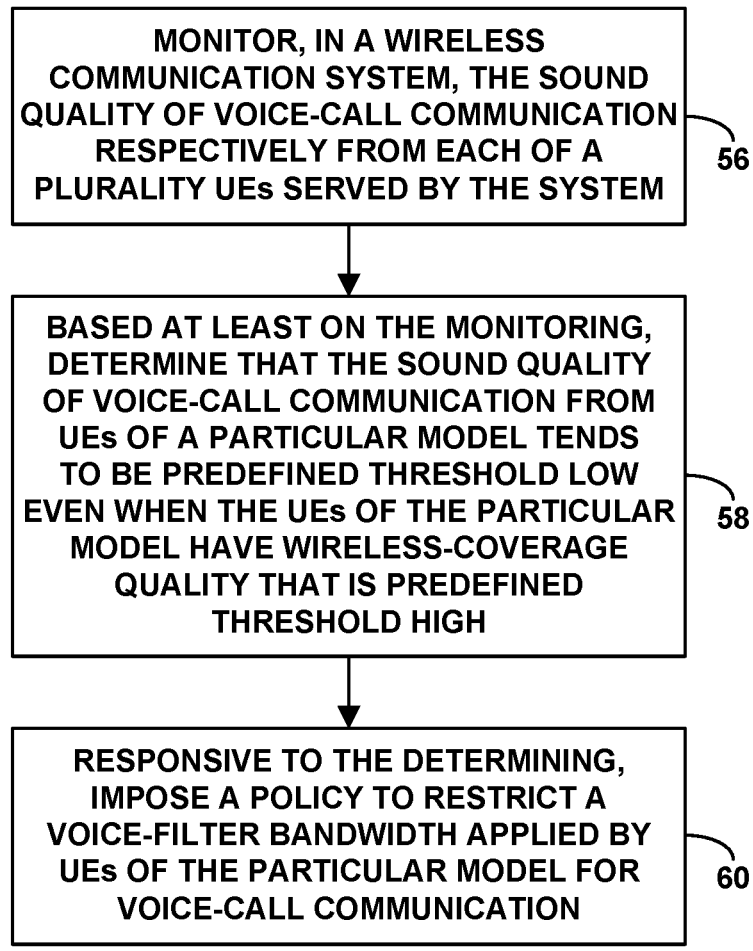
FIG. 3 is a flow chart depicting example operations that can be carried out in accordance with the disclosure.

FIG. 3 is a flow chart depicting operations that can be carried out in accordance with this disclosure, to limit the voice-filter bandwidth of UEs based on observed sound quality of voice-call communications.

As shown in FIG. 3, at block 56, the method includes monitoring, in a wireless communication system, the sound quality of voice-call communication respectively from each of a plurality UEs served by the system. Further, at block 58, the method includes, based at least on the monitoring, determining that the sound quality of voice-call communication from UEs of a particular model tends to be predefined threshold low even when the UEs of the particular model have wireless-coverage quality that is predefined threshold high. And at block 60, the method includes, responsive to the determining, imposing a policy to restrict a voice-filter bandwidth applied by UEs of the particular model for voice-call communication.

In line with the discussion above, the act of monitoring the sound quality of the voice-call communication in this method could involve determining a MOS of the voice-call communication. Further, the monitoring could involve implementing a voice probe respectively within each of one or more voice-call communication paths of the wireless communication system, where the voice probe evaluates the sound quality of voice-call communication and records the evaluated sound quality in correlation with associated UE identity and timestamp information.

In addition, the act of determining, based at least on the monitoring, that the sound quality of voice-call communication from UEs of the particular model tends to be predefined threshold low could involve determining, based at least the monitoring, that sound quality of voice-call communication from at least a predefined threshold large portion of UEs of the particular model has been predefined threshold low.

Further, as discussed above, the act of determining, based at least on the monitoring, that the sound quality of voice-call communication from UEs of the particular model tends to be predefined threshold low even when the UEs of the particular model have wireless coverage quality that is at least predefined threshold high could involve (i) identifying instances where sound quality of voice-call communication from individual UEs of the particular model was predefined threshold low and (ii) based on coverage-quality data that represents wireless-coverage quality, such as SINR, experienced respectively by each UE of the individual UEs during the voice-call communication from the UE, identifying a subset of the instances where, in each instance, sound quality of voice-call communication from a respective UE of the particular model was predefined threshold low when wireless-coverage quality experienced by the respective UE was predefined threshold high. For instance, identifying the subset could involve mapping sound-quality records with wireless-coverage-quality records based on UE identifier and timestamp information.

In addition, as discussed above, the act of imposing the policy to restrict the voice-filter bandwidth applied by UEs of the particular model for voice-call communication could involve limiting the voice-filter bandwidth to be narrower than a predefined bandwidth. For instance, each UE of the particular model might use the EVS codec for encoding voice communication, EVS may support voice-filter bandwidths including narrowband, wideband, and super-wideband, and limiting the voice-filter bandwidth to be narrower than the predefined bandwidth could involve limiting the voice-filter bandwidth to be narrower than super-wideband.

Further, as discussed above, the act of limiting the voice-filter bandwidth to be narrower than the predefined bandwidth could involve directing the UEs of the particular model to so limit the voice-filter bandwidth. For instance, this could be done when a UE of the particular model attaches with the wireless communication service and could involve transmitting to the UE a bandwidth specification that causes the UE to so limit the voice-filter bandwidth.

Alternatively limiting the voice-filter bandwidth to be narrower than the predefined bandwidth could involve, during setup of a voice-call communication with a UE of the particular model, transmitting to the UE a bandwidth specification that causes the UE to so limit the voice-filter bandwidth. For instance, setup of the voice-call communication with the UE could involve the UE engaging in voice-call setup signaling with an IMS, and transmitting to the UE the bandwidth specification could involve the IMS transmitting the bandwidth specification to the UE within the voice-call setup signaling.

In line with the discussion above, the act of detecting that the sound quality of voice-call communication from UEs of a particular model tends to be lower than a predefined threshold sound-quality level even when the UEs of the particular model have wireless-coverage quality that is at least predefined threshold high could be carried out by a processing system such as the computing system of FIG. 2 for instance, in the manner described above for instance.

Further, the act of imposing the policy, based at least on the detecting, to restrict voice-filter bandwidth applied by UEs of the particular model for voice-call communication could be carried out by the same processing system or by another similar processing system. For instance, the HSS, MME, base station, and/or IMS could incorporate the other processing system, similarly comprising a processing unit, data storage, and program instructions stored in the data storage and executable by the processing unit to carry out associated operations. Such a processing system could operate to convey to UEs of the particular model indications, directives, or the like to cause the UEs to restrict the bandwidth of the voice-filter that they apply.

From another perspective, the present disclosure thus contemplates a wireless communication system that includes a plurality of base stations, a core network, a voice-quality probe, and a computing system.

The plurality of base stations are configured to serve UEs. And the core network is configured to provide connectivity between the base stations and a transport network, the core network including a gateway through which communications from the served UEs flow. And the voice-quality probe could be disposed at the gateway and could be configured to determine sound quality of voice-call communications from individual UEs and to establish sound-quality data specifying the determined sound quality in correlation with UE identify and timestamp information.

The computing system could then be configured to (i) make a determination based on the established sound-quality data, in correlation with UE-model information and wireless-coverage quality information, that sound quality of voice-call communication from UEs of a particular model tends to be predefined threshold low even when wireless-coverage quality of the UEs of the particular model is predefined threshold high and (ii) responsive to the determining, restrict voice-filter bandwidth applied by the UEs of the particular model.

Exemplary embodiments have been described above. Those skilled in the art will understand, however, that changes and modifications may be made to these embodiments without departing from the true scope and spirit of the invention.

We claim:

1. A method comprising:
monitoring, in a wireless communication system, sound quality of voice-call communication respectively from each of a plurality of user equipment devices (UEs) served by the system;
determining, based at least on the monitoring, that the sound quality of voice-call communication from UEs of a particular model tends to be predefined threshold low even when the UEs of the particular model have wireless-coverage quality that is predefined threshold high; and
responsive to the determining, imposing a policy to restrict a voice-filter bandwidth applied by UEs of the particular model for voice-call communication.

2. The method of claim 1, wherein monitoring the sound quality of the voice-call communication comprises determining a Mean Opinion Score of the voice-call communication.

3. The method of claim 1, wherein monitoring the sound quality of the voice-call communication comprises implementing a voice probe respectively within each of one or more voice-call communication paths of the wireless communication system, wherein the voice probe evaluates the sound quality of voice-call communication and records the evaluated sound quality in correlation with associated UE identity and timestamp information.

4. The method of claim 1, wherein determining, based at least on the monitoring, that the sound quality of voice-call communication from UEs of the particular model tends to be predefined threshold low comprises determining, based at least the monitoring, that sound quality of voice-call communication from at least a predefined threshold large portion of UEs of the particular model has been predefined threshold low.

5. The method of claim 4, wherein determining, based at least on the monitoring, that the sound quality of voice-call communication from UEs of the particular model tends to be predefined threshold low even when the UEs of the particular model have wireless coverage quality that is at least predefined threshold high comprises:
identifying instances where sound quality of voice-call communication from individual UEs of the particular model was predefined threshold low;
based on coverage-quality data that represents wireless-coverage quality experienced respectively by each UE of the individual UEs during the voice-call communication from the UE, identifying a subset of the instances where, in each instance, sound quality of voice-call communication from a respective UE of the particular model was predefined threshold low when wireless-coverage quality experienced by the respective UE was predefined threshold high.

6. The method of claim 5, wherein the wireless-coverage quality comprises a measure of signal-to-interference-plus-noise ratio.

7. The method of claim 5, wherein identifying the subset comprises mapping sound-quality records with wireless-coverage-quality records based on UE identifier and timestamp information.

8. The method of claim 1, wherein imposing the policy to restrict the voice-filter bandwidth applied by UEs of the particular model for voice-call communication comprises limiting the voice-filter bandwidth to be narrower than a predefined bandwidth.

9. The method of claim 1, wherein each UE of the particular model uses Enhanced Voice Services (EVS) codec for encoding voice communication, wherein EVS supports voice-filter bandwidths including narrowband, wideband, and super-wideband, and wherein limiting the voice-filter bandwidth to be narrower than the predefined bandwidth comprises limiting the voice-filter bandwidth to be narrower than super-wideband.

10. The method of claim 1, wherein limiting the voice-filter bandwidth to be narrower than the predefined bandwidth comprises directing the UEs of the particular model to so limit the voice-filter bandwidth.

11. The method of claim 10, wherein directing the UEs of the particular model to so limit the voice-filter bandwidth comprises:
when a UE of the particular model attaches with the wireless communication service, transmitting to the UE a bandwidth specification that causes the UE to so limit the voice-filter bandwidth.

12. The method of claim 1, wherein limiting the voice-filter bandwidth to be narrower than the predefined bandwidth comprises:
during setup of a voice-call communication with a UE of the particular model, transmitting to the UE a bandwidth specification that causes the UE to so limit the voice-filter bandwidth.

13. The method of claim 12, wherein the setup of the voice-call communication with the UE comprises the UE engaging in voice-call setup signaling with an Internet Multimedia Subsystem (IMS), and wherein transmitting to the UE the bandwidth specification comprises the IMS transmitting the bandwidth specification to the UE within the voice-call setup signaling.

14. The method of claim 1, wherein the particular model comprises a make, model, and firmware version.

15. A system comprising:
a first processing system configured to detect that sound quality of voice-call communication from user equipment devices (UEs) of a particular model tends to be lower than a predefined threshold sound-quality level even when the UEs of the particular model have wireless-coverage quality that is at least predefined threshold high;
a second processing system configured to impose a policy, based at least on the detecting, to restrict voice-filter bandwidth applied by UEs of the particular model for voice-call communication.

16. The system of claim 15,
wherein the first processing system comprises a first processing unit programmed to perform the detecting based on (i) first data representing monitoring of sound quality of voice-call communication respectively from each of a plurality of UEs and (ii) second data representing wireless-coverage quality reported by various UEs of the plurality, and
wherein the second processing system comprises a second processing unit programmed to impose the policy.

17. The system of claim 16, wherein the monitoring of the sound quality of the voice-call communication comprises determining a Mean Opinion Score of the voice-call communication.

18. The system of claim 16, wherein the detecting based on the first data and the second data comprises correlating the first data with the second data based on UE identity and timestamp information.

19. The system of claim 15, wherein imposing the policy to restrict the voice-filter bandwidth applied by UEs of the particular model for voice-call communication comprises limiting the voice-filter bandwidth to be narrower than a predefined bandwidth.

20. A wireless communication system comprising:
a plurality of base stations configured to serve user equipment devices (UEs);
a core network configured to provide connectivity between the base stations and a transport network, wherein the core network includes a gateway through which communications from the served UEs flow;
a voice-quality probe disposed at the gateway, wherein the voice-quality probe is configured to determine sound quality of voice-call communications from individual UEs and to establish sound-quality data specifying the determined sound quality in correlation with UE identify and timestamp information; and
a computing system configured to (i) make a determination based on the established sound-quality data, in correlation with UE-model information and wireless-coverage quality information, that sound quality of voice-call communication from UEs of a particular model tends to be predefined threshold low even when wireless-coverage quality of the UEs of the particular model is predefined threshold high and (ii) responsive to the determining, restrict voice-filter bandwidth applied by the UEs of the particular model.

* * * * *